United States Patent [19]

Despard, III

[11] 3,995,397

[45] Dec. 7, 1976

[54] PLANTER FOR PLANTS

[75] Inventor: Victor R. Despard, III, Lancaster, Pa.

[73] Assignee: Kaadan, Ltd., Lancaster, Pa.

[22] Filed: Jan. 14, 1976

[21] Appl. No.: 648,902

[52] U.S. Cl. .................................. 47/81; 240/17; D48/20 C; 47/72

[51] Int. Cl.² .................. A01G 27/00; F21L 19/00

[58] Field of Search ...................... D35/3 R–3 C; D48/20 B–20 D; 47/38.1, 41, 34; 431/102; 240/17, 75, 80, 83

[56] References Cited
UNITED STATES PATENTS

D176,616  1/1956  Kaufman et al. .............. D35/3 B X
D194,548  2/1963  Slaton .............................. D48/20 B

*Primary Examiner*—Robert E. Bagwill
*Attorney, Agent, or Firm*—C. Hercus Just

[57] ABSTRACT

A planter for plants comprising a lamp of the oil-burning type and comprising a glass base adapted to contain water, a burner having a wick extending therethrough, and a transparent chimney, the lower end of which is sealed relative to the perimeter of the burner and soil is disposed in at least the lower portion of said chimney and said wick extending into said soil to convey moisture from the base into said soil by capillary action.

6 Claims, 4 Drawing Figures

PLANTER FOR PLANTS

BACKGROUND OF THE INVENTION

Planters containing living plants rooted in soil which is rendered moist by suitable wick means through capillary action have been known for many years. The following patents are representative of various types of planters which have been developed in the last century, all of these employing some type of wick means to render the soil moist by capillary action of water derived from a suitable reservoir:

| | | |
|---|---|---|
| 253,611 | Johnston | Feb. 14, 1882 |
| 1,264,096 | Lelievre | Aug. 23, 1918 |
| 1,621,818 | Wallace | Mar. 22, 1927 |
| 2,300,776 | Collins | Nov. 3, 1942 |

All of the foregoing patents have different means for arranging the wicks by which moisture is delivered to the soil in which a plant is rooted. Accordingly, there is nothing new in the present invention as to the broad prinicpal of furnishing moisture to the soil of a planter for plants by wick means utilizing capillary action to convey moisture from a reservoir to the soil for the plants. However, the present invention utilizes a relatively well known structure comprising a lamp of the oil-burning type as a planter for plants and in doing so, does not destroy the possibility of the lamp being restored to illuminating purposes when it is no longer to be used as a planter. Such adaptation of a lamp to use as a planter requires certain innovations of a simple but novel nature which are described in detail hereinafter.

SUMMARY OF THE INVENTION

It is the principle object of the present invention to utilize a lamp of the oil-burning type as a planter by employing a lamp in which the burner is provided with a minimum amount of suitably arranged vent perforations which in the preferred embodiment of the invention are covered by sealing means such as floral clay which is of a plastic consistency and relatively tacky, said clay being arranged in somewhat ribbon-like configuration around the periphery of the gallery of the burner to cover the vent openings and also effect means for securing the lower end of a transparent lamp chimney against the perimeter of said gallery of the burner, particularly to prevent accidental tipping of the chimney with respect to the burner when the chimney contains soil and plants.

It is another object of the invention to utilize a lamp having a burner which is suitably coated either with appropriate metal plating or other corrosion-preventing nature in order to maintain the burner in condition to be converted to illuminating purposes when desired.

A further object of the invention is to employ a wick of textile nature which extends through the burner and the opposite ends thereof respectively are disposed in water within the base of the lamp and soil in the lower portion of the lamp chimney, the end of the wick which is disposed in said soil preferably being split into a plurality of longitudinal sections and said sections being spread apart in the soil so as to more effectively transmit moisture to the soil than if the wick were in its original condition.

A still further object of the invention is to use a lamp base which is molded or otherwise formed from glass which is suitably colored to prevent the formation of fungus in the water in the base which serves as a reservoir for moisture for the soil in the planter.

Details of the foregoing objects and of the invention, as well as other objects thereof, are set forth in the following specification and illustrated in the accompanying drawing comprising a part thereof.

DETAILED DESCRIPTION

Figure 1:
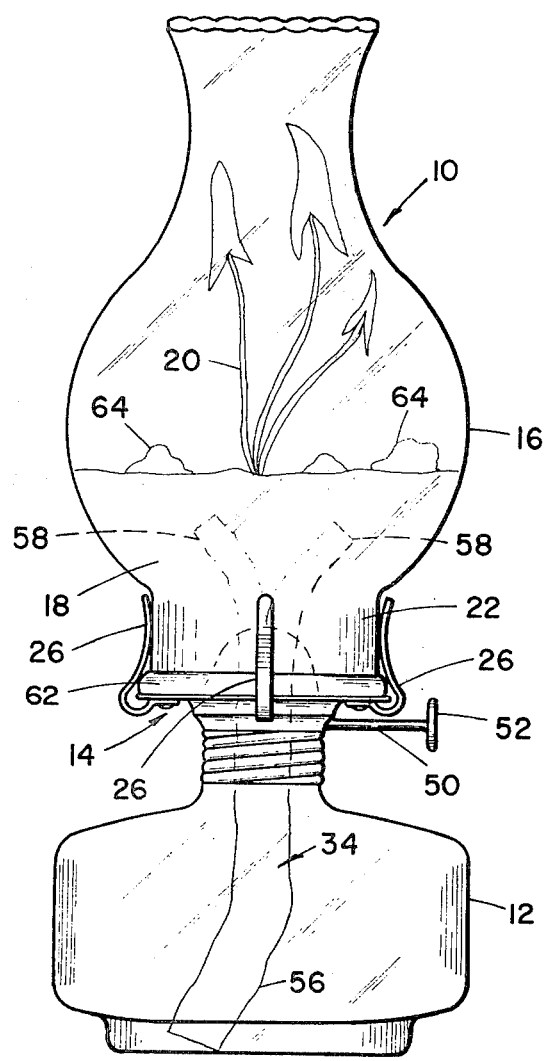
FIG. 1 is a side elevation of an exemplary lamp of the oil burning type adapted to use as a planter in accordance with the principles of the present invention.

Referring to FIG. 1, there is illustrated a lamp 10 of the oil-burning type comprising a base 12 which, for durability, preferably is molded from glass having a suitable color, as distinguished from clear glass, for purposes of minimizing if not absolutely preventing the occurance of fungus within water which is contained within the base 12. If desired, the base 12 also may be formed from an appropriate plastic material but, preferably, regardless of the material from which the base is formed, it is at least partially transparent especially for purposes of determining the level of the water therein when the lamp is serving as a planter as in the present invention.

The lamp 10 also comprises a burner 14 which preferably is formed from metal, the burner 14 having means to support a lamp chimney 16 which is formed from a suitable transparent material such as glass or plastic. For purposes of adapting the chimney to contain soil 18 and a plant 20, the chimney 16 preferably is of the bulbous type to provide ample space within which the soil 18 and plant 20 may be contained. The chimney 16 also has a lower, substantially cylindrical base portion 22 which is supported by the gallery 24 of the burner 14, the base portion 22 being received between the upper portion of the prongs 26 which are connected at the lower ends thereof to the gallery 24 by appropriate means such as rivets 28 which are best shown in FIG. 3.

Figure 2:
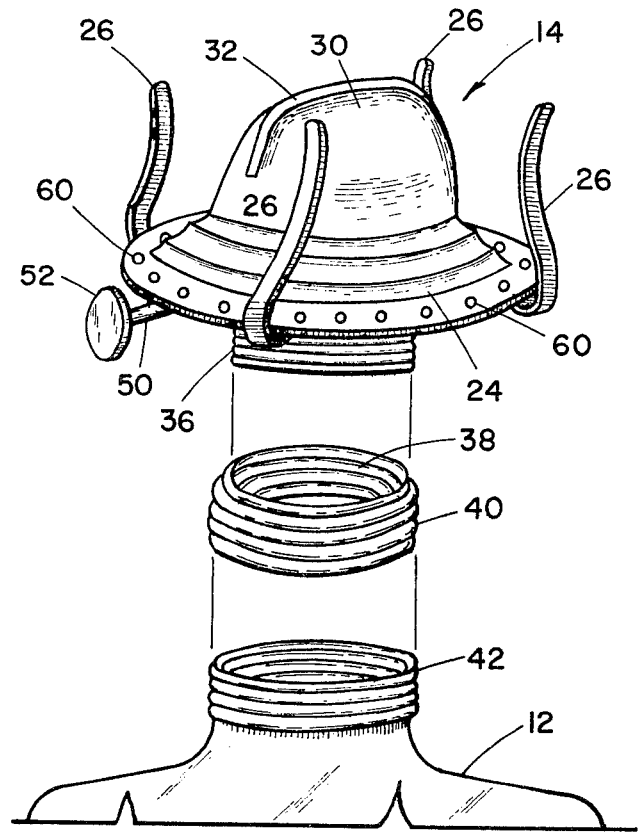
FIG. 2 is a fragmentary, exploded view of the burner, upper portion of the lamp base, and connecting means by which the burner is connected to the upper portion of the base and only the upper portion of the base being shown in fragmentary manner.
Figure 3:
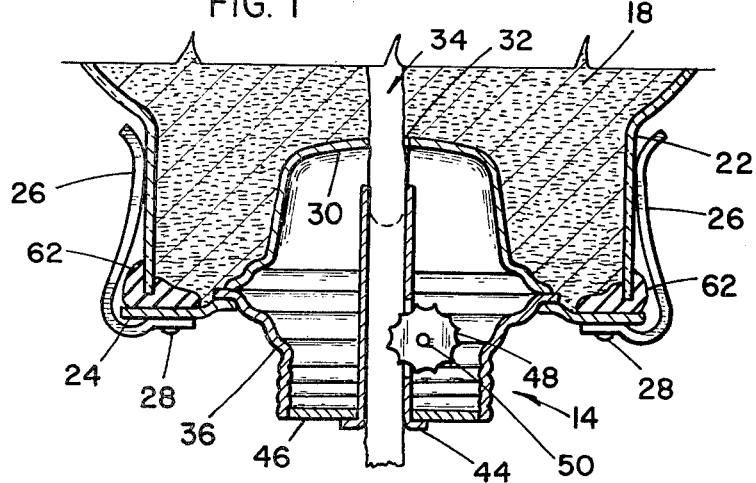
FIG. 3 is a fragmentary vertical sectional view in a larger scale than employed in FIG. 1 and showing the preferred manner of sealing the lower end of the lamp chimney to the perimeter of the gallery of the burner, only the lower portion of the lamp chimney being illustrated in said figure and the lower end of the wick which extends through the burner also being foreshortened.
Figure 4:
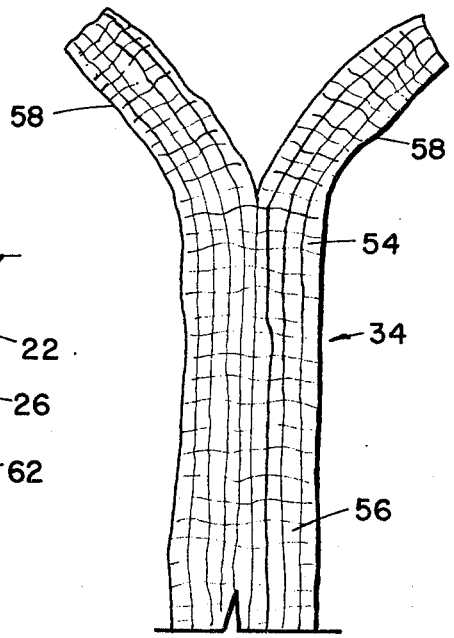
FIG. 4 is a fragmentary plan view of an exemplary textile-type wick and illustrating particularly the upper portion thereof which is split longitudinally and separated in an exemplary manner for disposition within the soil in the lower portion of the lamp chimney so as to provide efficient distribution of moisture into the soil from the lamp base.

Referring particularly to FIGS. 2 and 3, the burner 14 in addition to having the gallery 24 that is shaped centrally in a substantially hemi-spherical upper portion 30 which has a slot 32 through which the portion of the wick 34 extends, also has a downwardly extending neck 36, the lower end of which is externally threaded with threads of a relatively fine pitch which mate with complementary threads 38 within the upper interior portion of a collar 40 that is provided with outer, relatively coarse threads which are complementary to threads 42 which are formed on the upper end of base 12. The neck 36 as well as the gallery 24 and upper portions 30 of the burner 14 are all appropriately formed from suitable metal such as brass or coated steel. In the event the components of the burner 14 are formed from steel, the coating thereon to prevent corrosion when used as described hereinafter may comprise any appropriate material such as lacquer, varnish, or otherwise, preferably a reasonably heavy coating thereof being applied especially to the upper surfaces of the gallery 24 and upper portion 30 of said burner.

The type of wick 34 which is provided with the lamp 10 is of the conventional type and may be formed from cotton, a mixture of cotton with other materials such asbestos, or otherwise, said wick being of the type which readily serves to transmit moisture by capillary action. Said wick is of a flat nature and the width and thickness thereof is complementary to a relatively flat tubular guide member 44 shown in FIG. 3, the lower end thereof being suitably fixed by soldering or otherwise to the transverse lower portion 46 of the neck 36 of the burner 14. The upper end of the wick extends through the slot 32 in the upper portion 30 of burner 14. For purposes of raising or lowering the wick with respect to the burner 14, the guide member 44 is provided in one wall with a slot through which a portion of the periphery of a toothed wheel 48 extends, said toothed wheel being mounted upon and fixed to a shaft 50 intermediately of the ends thereof, the outer end of shaft 50 having a manually operable circular member 52 thereon, the periphery of which preferably is knurled to enhance frictional engagement therewith for manual operation.

The wick 34 is of suitable length to have an upper portion 54 which extends appreciably above the burner 14 when disposed in operative position, and the lower portion 56 thereof preferably is of such length that it extends well into the interior of base 12 and can thereby readily absorb water within the base for transmittal by capillary action to the upper portion 54 of the wick which extends above the burner 14 into the lower portion of the chimney 16. The upper portion 54 of the wick preferably is split longitudinally to provide a plurality of sections 58 which are appropriately spread apart so as to extend in different directions into the soil 18 within the chimney 16 as shown in phantom in FIG. 1.

When the burner 14 is used for illuminating purposes, the gallery 24 is provided with a number of ventilating perforations 60 such as shown in exemplary manner in FIG. 2. These perforations permit the passage of air to the wick when burning and extending above the slot 32, such extent depending upon the degree of illumination which is desired. However, when the lamp is serving as a planter, it is preferred that the ventilating perforations 60 be closed and this is achieved by the application of sealing material 62 which comprises a suitable plastic type of material, which is relatively tacky, such as floral clay that is readily available in florist shops and, in consistencies, somewhat resembles modeling clay. Such material is worked into a ribbon-like strip and is extended around the upper surface of the gallery 24 of burner 14, covering the perforations 60, and preferably extending beyond the perimeter of the gallery. The lower edge of the base portion 22 of chimney 16 then is pressed into the material 62 which engages the chimney with an adhesive gripping action to effectively secure the chimney to the burner 14. To enhance such securing operation, the outermost portion of the ribbon of material 62 then is worked upwardly around the outer surface of the lower portion of base portion 22 of the chimney, not only to provide more effective connection of the chimney to the burner but provide maximum sealing between the chimney and the burner 14 and thereby prevent the escape of soil from the chimney 16.

If at any time the lamp is to be restored to illuminating operation, it is only necessary to disengage the chimney 16 from the burner 14, remove the soil and plants from the lower portion of the chimney, clean the upper surface of the burner to remove all soil particles therefrom and install a new wick in the burner. In accordance with the preferred merchandizing of the present invention, a second wick is provided in a kit for that purpose, said kit comprising all portions of the planter as described herein. When the burner is made from brass, little if any corrosion will occur as the result of soil engaging the same and, if made from steel, the coating referred to above also minimizes the possibility of corrosion occuring on the burner, whereby the same readily may serve as a conventional burner for illuminating purposes.

From the foregoing, it will be seen that the present invention provides an attractive and mechanically effective planter for plants formed from a lamp of the oil burning type and, particularly by means of employing the sealing material 62 and the method of installing the same described above, the lamp burner 14 and the chimney 16 are quickly adapted to planter condition. By slitting the upper portion of the wick 34 and introducing a supply of water to the base 12, the base 12 then made be quickly connected to the burner 14 and the upper slit portion of the wick is extended into the lower portion of the chimney 16. Soil is introduced into the top of the chimney, which is open, and by using an appropriate implement such as a spoon, bent piece of wire, or otherwise, the soil quickly is arranged in the lower portion of the chimney and the plant is introduced when a certain amount of the soil has been placed in the chimney, followed by the introduction of additional soil around the base of the plant. If desired, appropriate ornamental stones or rocks 64, or other ornamental objects may be introduced as is frequently found in planters of conventional type. As the water is consumed from the base 12, it readily may be replenished by unscrewing the base 12 from the collar 40 and refilling the base to a desired level, followed by threadably reconnecting the base 12 to the collar 40. This is readily accomplished by manually holding the burner 14 and lower portion of the chimney 16 which is connected thereto by the sealing material 62.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A self-watering planter for plants comprising an oil-burning type lamp including a hollow base, a burner having means to support a wick and a laterally extending gallery supporting a plurality of prongs extending upwardly away from said base, hollow circular connecting means on said base and burner detachably securing the same together and provide a passage therethrough, a flat-type wick formed from textile material and capable of absorbing water and transmitting it along the wick by capillary action, and a transparent lamp chimney having a base portion fitting the rim of said gallery of said burner and engaged by said fingers thereon to support said chimney in upright position upon said burner, in combination with sealing material between the perimeter of said gallery of said burner and the rim of the base of said chimney to secure said chimney to said burner, and agricultural soil in the lower part of said chimney and supported by said gallery of said burner, said soil being adapted to have plants planted therein and said wick being arranged to have a portion extended upwardly into said soil and also extend through said burner into said base and adapted by capillary action to convey water from said base through said hollow connecting means for said burner and base into said soil to maintain said soil moist.

2. The planter according to claim 1 in which the upper portion of said wick extending into said soil is split into a plurality of longitudinal sections, said sections being spread apart in said soil to efficiently distribute moisture thereto.

3. The planter according to claim 1 in which said base is formed from transparent colored glass to prevent the formation of fungus in said base when containing water for moisturing the soil in said chimney.

4. The planter according to claim 1 in which the surfaces of said burner exposed to said soil are coated to prevent corrosion thereof by said soil and moisture.

5. The planter according to claim 1 in which said sealing material is tacky plastic material of a clay-like nature.

6. The planter according to claim 1 in which said lamp chimney has a substantially cylindrical lower base portion engaged by said prongs of said burner and a bulbous midportion immediately above said lower base portion to provide ample space for soil.

* * * * *